(12) United States Patent
Fujimoto et al.

(10) Patent No.: US 11,592,698 B2
(45) Date of Patent: Feb. 28, 2023

(54) INFORMATION PROCESSING APPARATUS

(71) Applicant: PANASONIC INTELLECTUAL PROPERTY MANAGEMENT CO., LTD., Osaka (JP)

(72) Inventors: Romu Fujimoto, Kanagawa (JP); Takeyuki Sasaki, Kanagawa (JP); Yasuji Wakiyama, Kanagawa (JP); Yasuyuki Tanaka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/575,237

(22) Filed: Jan. 13, 2022

(65) Prior Publication Data

US 2023/0013629 A1    Jan. 19, 2023

(30) Foreign Application Priority Data

Jul. 16, 2021 (JP) .............................. JP2021-117900

(51) Int. Cl.
  *G02F 1/1333* (2006.01)
  *G06F 3/041* (2006.01)
  *G06Q 20/20* (2012.01)

(52) U.S. Cl.
  CPC .... *G02F 1/13338* (2013.01); *G02F 1/133308* (2013.01); *G06Q 20/204* (2013.01); *G06F 3/0412* (2013.01)

(58) Field of Classification Search
  CPC .................................................... G06F 1/1632
  See application file for complete search history.

(56) References Cited

U.S. PATENT DOCUMENTS

| | | | | |
|---|---|---|---|---|
| 6,498,603 B1 * | 12/2002 | Wallace | ............... | G06F 3/0436 345/173 |
| 2009/0137296 A1 * | 5/2009 | Takahashi | ........... | A63F 13/5375 463/3 |
| 2012/0188694 A1 * | 7/2012 | Sakakibara | ........... | G06F 1/1656 361/679.01 |
| 2017/0061746 A1 * | 3/2017 | Tanaka | ................. | G06K 7/0004 |

FOREIGN PATENT DOCUMENTS

JP      2012-185543      9/2012

* cited by examiner

*Primary Examiner* — Van N Chow
(74) *Attorney, Agent, or Firm* — Greenblum & Bernstein, P.L.C.

(57) ABSTRACT

An information processing apparatus includes: a housing; a substrate fixed in the housing; a touch panel installed in the housing and disposed to be inclined in a direction approaching the substrate toward a front of the information processing apparatus; and an opening detection switch provided between an edge of the touch panel on a front side and the substrate. The opening detection switch includes: a contact opening and closing portion fixed to the substrate; a key top having a hemispherical surface in contact with the edge; and an elastic member elastically deformable by a pressing force from the key top pressed by the edge to press down the contact opening and closing portion.

4 Claims, 8 Drawing Sheets

INFORMATION PROCESSING APPARATUS

CROSS-REFERENCE TO RELATED APPLICATIONS

This application is based on and claims the benefit of priority of Japanese Patent Application No. 2021-117900 filed on Jul. 16, 2021, the entire contents of which are incorporated herein by reference.

FIELD

The present disclosure relates to an information processing apparatus.

BACKGROUND

JP-A-2012-185543 discloses a portable payment terminal capable of executing all payment functions with any of a magnetic stripe card, a contact IC card, and a contactless IC card. The portable payment terminal includes a touch panel display.

SUMMARY

In order to improve operability, a screen of the touch panel display may be inclined to make it easy to see. In addition, since the received analog signal is prone to be attacked, the touch panel display may be provided with an opening detection switch configured to detect opening of the touch panel so that an electronic component connected to the touch panel is not taken away.

However, when the touch panel is inclined relative to a substrate disposed in the apparatus, a contact opening and closing portion of the opening detection switch provided on the substrate cannot be pressed in a direction perpendicular to the substrate. Accordingly, the opening detection switch may malfunction, and the opening detection function may not be sufficiently exhibited. As a result, security of information leakage may be deteriorated.

The present disclosure has been made in view of the above-described circumstances, and an object thereof is to provide an information processing apparatus capable of preventing malfunctions of an opening detection switch and also preventing deterioration in security.

In an aspect of the present disclosure, there is provided an information processing apparatus including: a housing; a substrate fixed in the housing; a touch panel installed in the housing and disposed to be inclined in a direction approaching the substrate toward a front of the information processing apparatus; and an opening detection switch provided between an edge of the touch panel on a front side and the substrate, wherein the opening detection switch includes: a contact opening and closing portion fixed to the substrate; a key top having a hemispherical surface in contact with the edge; and an elastic member elastically deformable by a pressing force from the key top pressed by the edge to press the contact opening and closing portion.

According to the present disclosure, malfunctions of the opening detection switch are less likely to occur, and deterioration in security can be prevented.

DETAILED DESCRIPTION

Hereinafter, embodiments specifically disclosing an information processing apparatus according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The attached diagrams and the following description are provided for those skilled in the art to sufficiently understand the present disclosure, and are not intended to limit the matters described in the scope of the claims.

Figure 1:
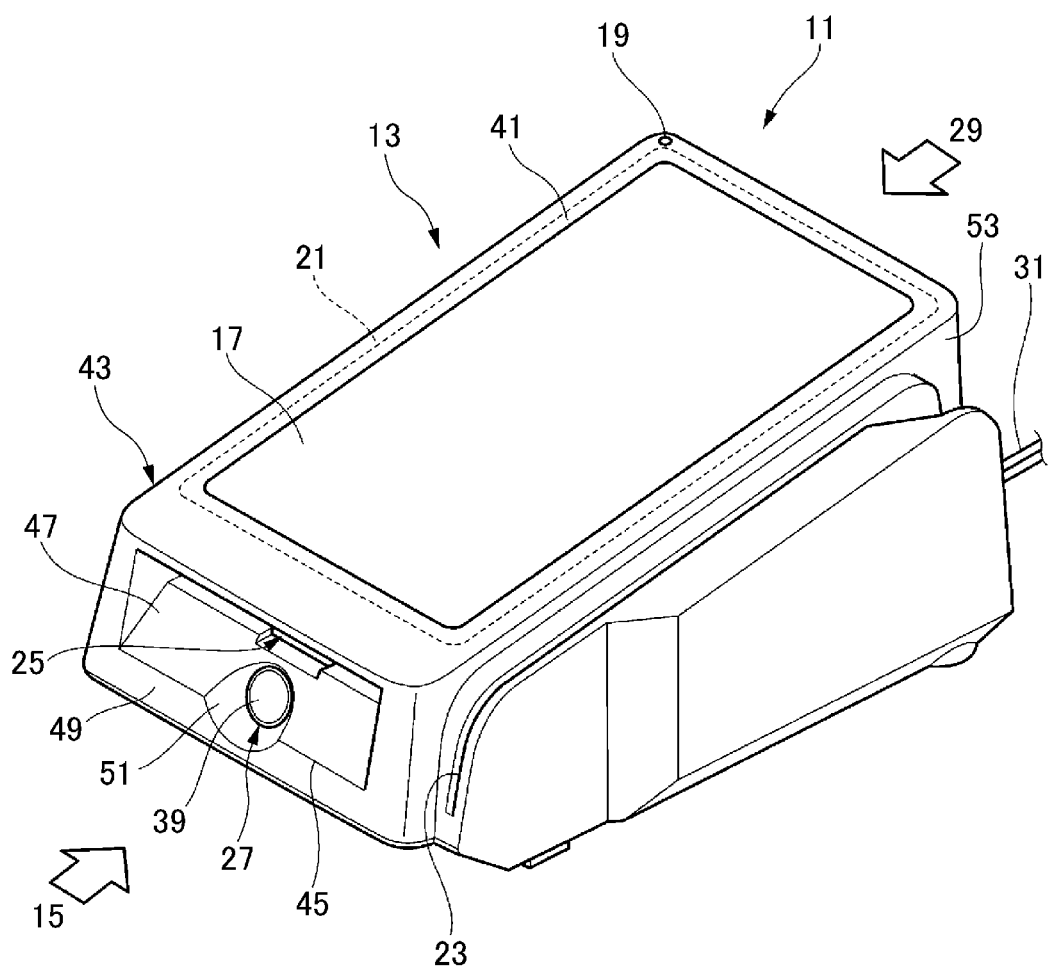
FIG. 1 is a front perspective view illustrating an example of an external appearance of an information processing apparatus according to a first embodiment.
Figure 1:
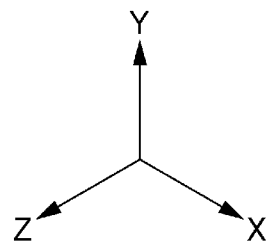

FIG. 1 is a front perspective view illustrating an example of an external appearance of an information processing apparatus 11 according to a first embodiment. Each direction in the present embodiment follows a direction of an arrow attached to an X axis, a Y axis, and a Z axis illustrated in each drawing. Here, the X-axis direction is a direction parallel to a horizontal plane. The Y-axis direction is a direction perpendicular to the horizontal plane and is parallel to a vertical direction. The Z-axis direction is a direction parallel to the horizontal plane and perpendicular to the X-axis direction. In the present embodiment, the X-axis direction is also referred to as the left-right direction, the +X direction (X-axis positive direction) is also referred to as the rightward direction, and the −X direction (X-axis negative direction) is also referred to as the leftward direction. The Y-axis direction is also referred to as the up-down direction, the +Y direction (Y-axis positive direction) is also referred to as the upward direction, and the −Y direction (Y-axis negative direction) is also referred to as the downward direction. The Z-axis direction is also referred to as a front-back direction, the +Z direction (Z-axis positive direction) is also referred to as the frontward direction, and the −Z direction (Z-axis negative direction) is also referred to as a backward direction. In each of the drawings, a circle surrounding a point at an intersection of the orthogonal axes indicates a direction from the back side of a paper surface to the front side of the paper surface, and a circle surrounding X at an intersection of the orthogonal axes indicates a direction from the front side of the paper surface to the back side of the paper surface.

An information processing apparatus 11 is, for example, a stationary apparatus, and is used by being placed on a horizontal plane (for example, a table). In FIG. 1, the lateral direction of a bottom of the information processing apparatus 11 is along the X-axis direction, and the longitudinal direction of the bottom of the information processing apparatus 11 is along the Z-axis direction. The information processing apparatus 11 is, for example, a payment processing apparatus.

The information processing apparatus 11 includes a body 13. The body 13 has a box shape. A user operates the information processing apparatus 11 from a front 15 of the information processing apparatus 11. The user may be a purchaser of a product or a customer in a store. The information processing apparatus 11 is connected to a store terminal (not illustrated) operated by a store clerk. The information processing apparatus 11 is capable of executing various types of payment processing in cooperation with the store terminal. The store terminal executes, for example, input of a product, input of the amount of money, and selection of a payment method via an input device of the store terminal.

The information processing apparatus 11 includes a touch panel 17, a light emitting diode (LED) 19, a near field communication (NFC) antenna 21, a first card slot 23, a second card slot 25, and a camera 27. The NFC antenna 21 enables the contactless communication. The information processing apparatus 11 includes a cable 31 on a back 29. Examples of the cable 31 may include a power cable, a communication cable, a local area network (LAN) cable, and a universal serial bus (USB) cable.

Figure 2:
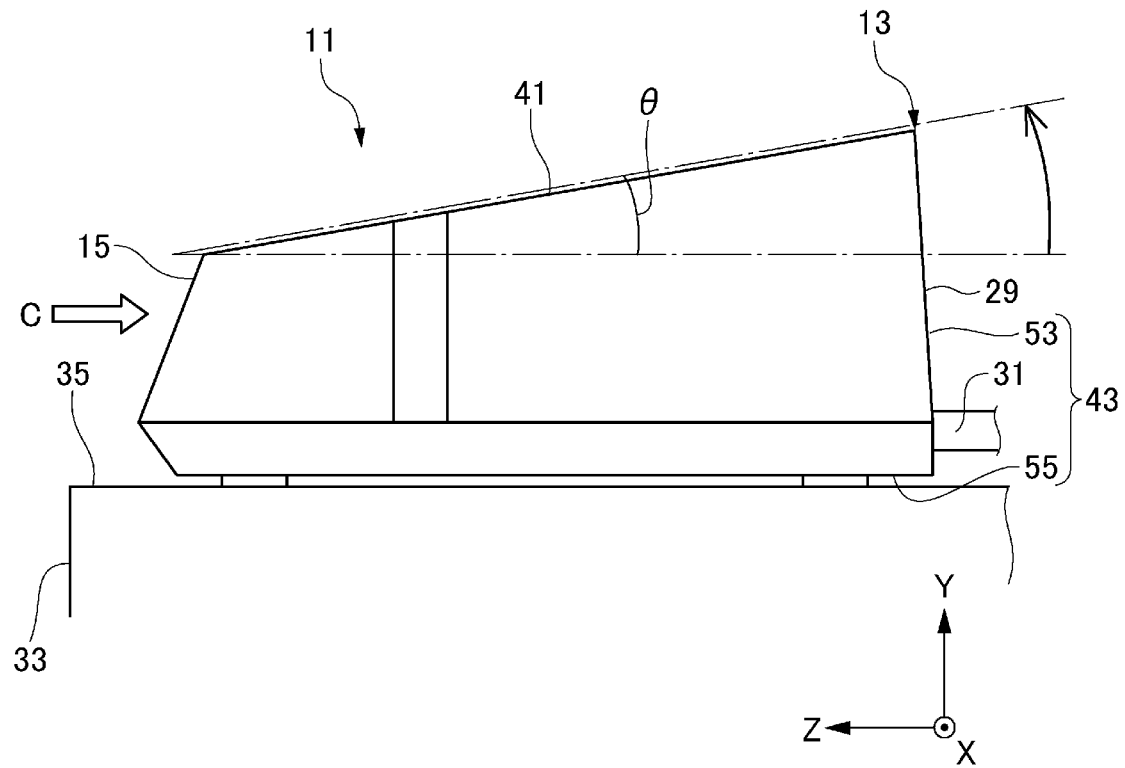
FIG. 2 is a side view of the information processing apparatus mounted on a counter.

FIG. 2 is a side view of the information processing apparatus 11 placed on a counter 33.

The information processing apparatus 11 is a composite type apparatus capable of executing payment processing in accordance with a plurality of payment methods. The information processing apparatus 11 can be used, for example, in a state of being placed on the horizontal placement surface 35 of the counter 33 of the store. The information processing apparatus 11 may execute the payment processing in accordance with any one of the payment methods.

Examples of a plurality of payment methods include credit card payment, electronic money payment, code (such as a QR code (registered trademark)) payment, and cash settlement. Examples of the credit card payment includes magnetic card payment, contact IC card payment, and contactless IC card payment. As for the electronic money, a plurality of types of electronic money may exist. The electronic money payment and the contactless IC card payment are also collectively referred to as contactless payment here since the payment is executed using contactless communication (for example, near field communication: NFC).

The plurality of payment methods are executed using a plurality of corresponding payment interfaces. Examples of the plurality of payment interfaces include a credit card, an electronic money card, a code, and cash. Examples of the credit card include a magnetic card, a contact IC card, and a contactless IC credit card.

The magnetic card is used for payment by being inserted into the first card slot 23. The contact IC card is used for payment by being inserted into the second card slot 25. The contactless IC credit card and the electronic money card are used for payment by approaching the NFC antenna 21. The contactless IC credit card and the electronic money card are also collectively referred to as a "contactless IC card".

Referring again to FIG. 1, the camera 27 includes a camera module 37 (see FIG. 3) and a lens 39. In the information processing apparatus 11, the NFC antenna 21 and the touch panel 17 may have the same height from the placement surface 35. That is, in the information processing apparatus 11, the NFC antenna 21 may be disposed around the touch panel 17 on the same plane. The surface on which the touch panel 17 is disposed is also referred to as a panel arrangement surface 41. The panel arrangement surface 41 may be, for example, a top of the body 13. For the information processing apparatus 11 in the present embodiment, the side on which the panel arrangement surface 41 is formed is referred to as the upper side, and the opposite side is referred to as the lower side.

The first card slot 23 is disposed along a side on a right side or a left side as viewed from the front 15, for example, on the right side in FIG. 1. In this case, the user can easily select any payment method from the plurality of payment methods corresponding to the plurality of devices arranged in front of the eyes.

In the information processing apparatus 11, a height of the back 29 is larger than that of the front 15. That is, the panel arrangement surface 41 of the body 13 of the information processing apparatus 11 is gradually lowered toward the user side. That is, when the user faces the second card slot 25, the orientation of the panel arrangement surface 41 of the information processing apparatus 11 is directed obliquely upward toward the user. As described above, in the information processing apparatus 11, the screen (the touch panel 17) installed on the panel arrangement surface 41 is inclined by the angle θ (see FIG. 2) for the usability of the user. On the other hand, when the insertion direction C of the contact IC card is inclined relative to the placement surface 35 similarly to the screen, it is difficult for the user to insert the contact IC card. Therefore, the insertion direction C of the contact IC card is a horizontal direction parallel to the placement surface 35 (a direction parallel to a substrate 63 to be described later).

The LED 19 is disposed on the panel arrangement surface 41 of the body 13 of the information processing apparatus 11. The arrangement position of the LED 19 is not limited to this example, and may be any position that can be visually recognized by the user. The LED 19 can be used, for example, for displaying a power-supply state of a power source.

The touch panel 17 is used for payment performed by the user. The touch panel 17 may be provided over the entire surface of the panel arrangement surface 41, or may be provided on a part of the panel arrangement surface 41. The touch panel 17 has an input function for receiving various operations performed by the user and inputting various pieces of data and information. The touch panel 17 has a display function of displaying various pieces of data, information, images, and the like. Therefore, the touch panel 17 can provide visual information to the user. On the touch panel 17, an input detection region where an input is detected and a display region where various types of display are performed may be the same region, or at least part of the input detection region and the display region may be different regions. The touch panel 17 is illustrated as an input unit for the user. However, the information processing apparatus 11 may include other input units (for example, physical keys and buttons).

The information processing apparatus 11 includes, on the front 15, an open space 45 in which a housing 43 of the body 13 is absent. An opening of the open space 45 is the widest on the front side, and is narrowed toward the back 29. That is, the diameter of the open space 45 increases from the back side toward the front side. The second card slot 25 and the lens 39 of the camera 27 are disposed in the open space 45.

For example, the second card slot 25 is located at a part of the open space 45 on the backmost side.

An inclined lower surface 47 is disposed at a lower portion of a peripheral end of the open space 45. The inclined lower surface 47 forms a tapered surface gradually approaches the placement surface 35 from the back side toward the front side. The inclined lower surface 47 is formed in, for example, a substantially planar shape. A lower frame surface 49 is connected to the inclined lower surface 47. The lower frame surface 49 is located at a lower portion around the open space 45 on the front side of the body 13 of the information processing apparatus 11. A part of a connecting part between the lower frame surface 49 of the body 13 and the inclined lower surface 47 of the open space 45 has a recessed shape and forms a recessed portion 51. The recessed portion 51 is a part of the open space 45.

A shape of a contour of the recessed portion 51 is, for example, a semi-arc shape or a semi-elliptical arc shape. The lens 39 of the camera 27 is exposed in the recessed portion 51. A front side of the lens 39 is not covered with the housing 43 of the body 13. Therefore, the camera 27 can introduce light from the outside of the information processing apparatus 11 through the recessed portion 51. The lens 39 is disposed in the recessed portion 51, so that a finger, dust, or the like of the user at the time of payment is not likely to reach the lens 39, and the lens 39 is protected from damage or adhesion of dirt.

Figure 3:
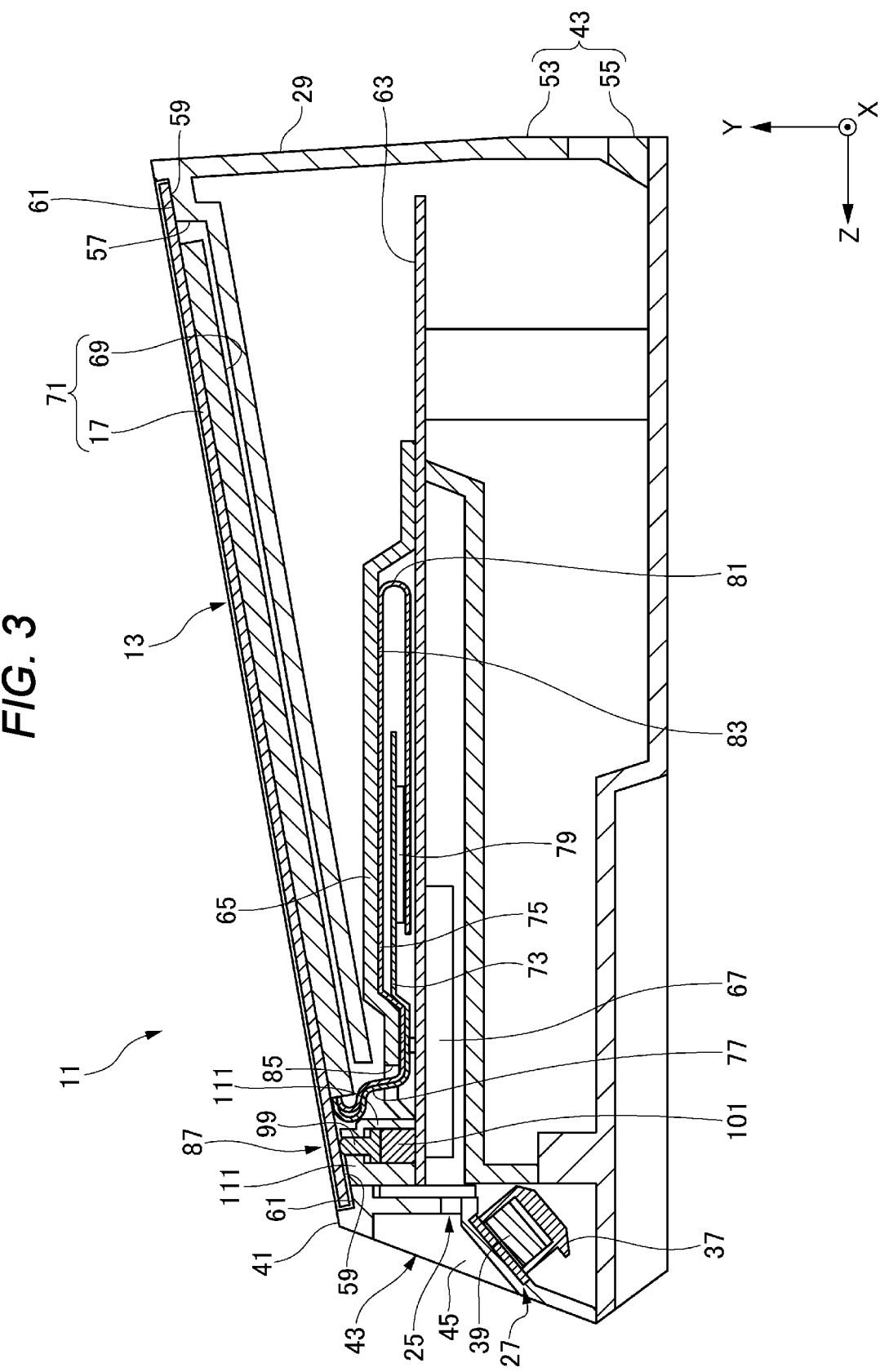
FIG. 3 is a side sectional view of the information processing apparatus illustrated in FIG. 1.

FIG. 3 is a side sectional view of the information processing apparatus 11 illustrated in FIG. 1.

The housing 43 of the body 13 includes an upper case 53 on which the panel arrangement surface 41 is formed, and a lower case 55 attached to a lower side of the upper case 53. A panel attachment open space 57 is formed in the panel arrangement surface 41 of the upper case 53. A stepped portion 61 on which an edge 59 of the touch panel 17 is placed is formed on an inner periphery of the panel attachment open space 57. That is, the touch panel 17 is installed on the panel arrangement surface 41 of the upper case 53 by placing the edge 59 on the stepped portion 61.

A substrate 63 having a rectangular shape being long in the front-back direction is fixed to a substantially central portion of the upper case 53 in the up-down direction. A holder member 65 is fixed to the upper case 53 between the touch panel 17 and the substrate 63 in a manner of being parallel to the substrate 63. A second card reader 67 is fixed to a surface of the substrate 63 opposite to the holder member 65. The second card reader 67 reads a contact IC card inserted from the second card slot 25. The contact IC card passes through the second card slot 25 and is inserted and removed in a direction parallel to the substrate 63.

The holder member 65 is formed using, for example, laser direct structuring (LDS) that forms a pattern by irradiating a resin with a laser. The holder member 65 is, for example, a resin member. The holder member 65 may be formed by other methods, for example, a method in which the holder member 65 is formed in a substantially rectangular shape by sheet metal processing of a metal plate.

In the information processing apparatus 11, for example, a liquid crystal display 69, which is a flat display device, is disposed on a backside of the touch panel 17 on the holder member 65 side. The touch panel 17 and the liquid crystal display 69 are integrally fixed. As the flat display device, an organic (Electro Luminescence) panel may be used instead of the liquid crystal display 69. The touch panel 17 and the liquid crystal display 69 are formed in, for example, a quadrangular shape. The quadrangular shape may be a rectangular shape that is long in the front-back direction of the information processing apparatus 11. The touch panel 17 and the liquid crystal display 69 that are integrally fixed constitute an input display module 71. In the input display module 71, the touch panel 17 is larger than the liquid crystal display 69, and the edge 59 of the touch panel 17 protrudes outward from a contour of the liquid crystal display 69 when viewed from the housing 43 side (the lower side in FIG. 3, i.e., the Y-axis negative side).

Figure 4:
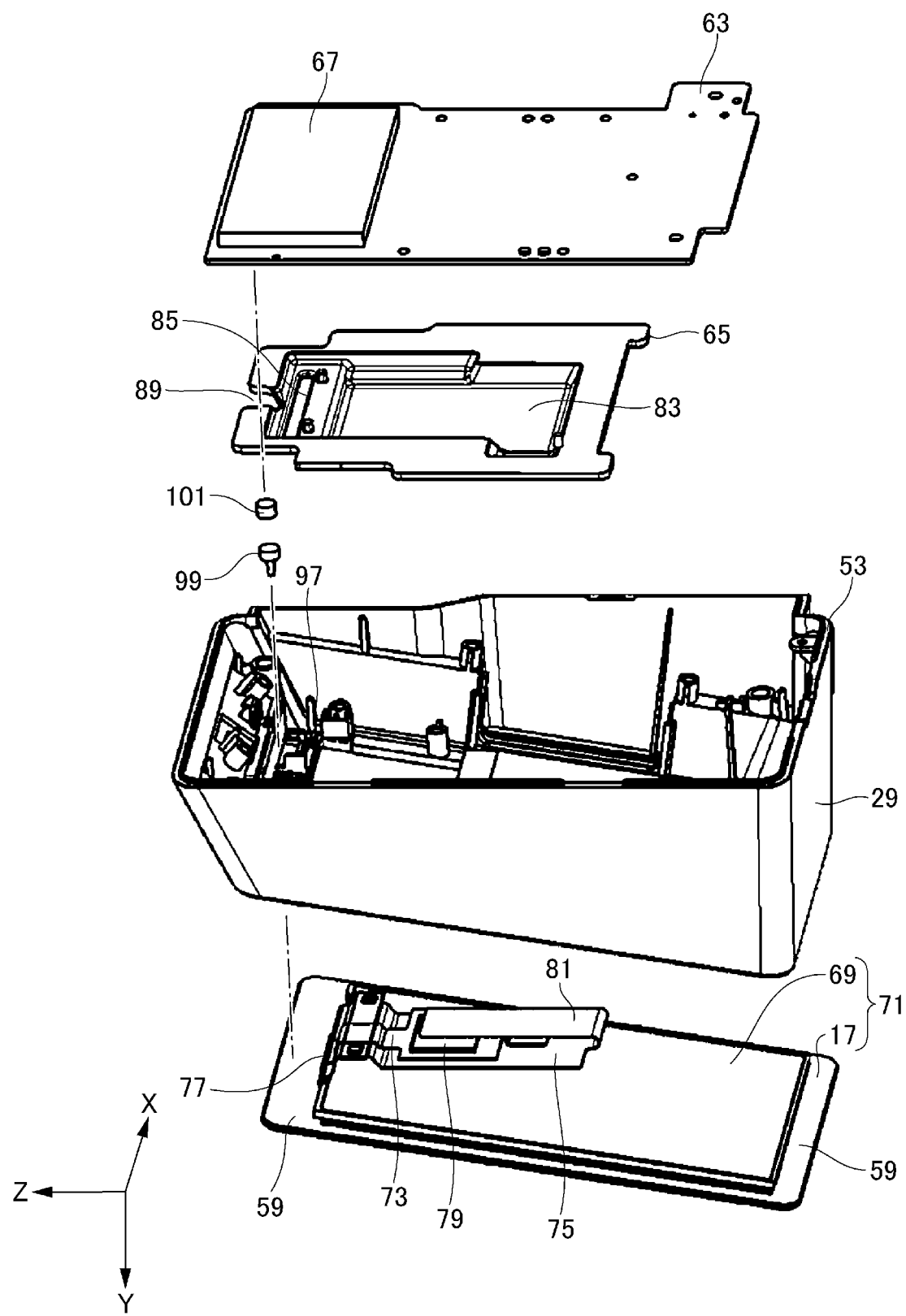
FIG. 4 is an exploded perspective view of a part of a body as viewed from below.

FIG. 4 is an exploded perspective view of a part of the body 13 as viewed from below.

The edge 59 of the touch panel 17 has, for example, a quadrangular frame shape surrounding the liquid crystal display 69. A first flexible substrate 73 that outputs touch operation information is led out from a backside on one (front) side of the pair of parallel short sides of the touch panel 17. The touch operation information may be information input by an operation on the touch panel 17. Similarly, a second flexible substrate 75 that receives display information is also led out from a front short side of the pair of parallel short sides of the liquid crystal display 69. The display information may be information displayed on the liquid crystal display 69. The first flexible substrate 73 and the second flexible substrate 75 are led out in the same order as a stacking order of the touch panel 17 and the liquid crystal display 69. The first flexible substrate 73 is led out to an upper layer side, and the second flexible substrate 75 is led out to a lower layer side when viewed from a front side of the information processing apparatus 11. The first flexible substrate 73 and the second flexible substrate 75 are bent by, for example, 180° via a bent portion 77 at a portion immediately after being led out. Therefore, the stacking order of the first flexible substrate 73 and the second flexible substrate 75 after being bent are reversed as viewed from the front side of the information processing apparatus 11, and the second flexible substrate 75 becomes the upper layer side and the first flexible substrate 73 becomes the lower layer side.

The first flexible substrate 73 and the second flexible substrate 75 are, for example, a flat circuit body obtained by forming a conductor pattern on an insulating sheet member. For this type of flat circuit body, it is possible to use a flexible flat cable (FFC) formed in a flexible band-shaped cable by covering a conductor made of a plurality of band-shaped thin plates with an insulating sheet member, a flexible printed circuit (FPC) obtained by printing a conductor pattern on a flexible insulating substrate, or the like.

An electronic component 79 (for example, various integrated circuits (ICs)) is mounted on the first flexible substrate 73 connected to the touch panel 17. The electronic component 79 stores information (for example, a personal identification number used for payment) input by the touch panel 17. The electronic component 79 is mounted on, for example, a surface of the first flexible substrate 73 on a side opposite to the second flexible substrate 75. A pad (not illustrated) to be electrically connected to a predetermined conductor is provided on a surface of the insulating member on a mounting surface of the first flexible substrate 73. The electronic component 79 is directly bonded to the pad, for example, with a surface electrode facing the pad. The first flexible substrate 73 and the second flexible substrate 75 may be connected to the substrate 63 by a connector (not illustrated).

The holder member 65 surrounds a part of the first flexible substrate 73 and a part of the second flexible substrate 75 between the holder member 65 and the substrate 63. The holder member 65 also surrounds, between the holder member 65 and the substrate 63, the electronic component 79 mounted on the first flexible substrate 73. Accordingly, the holder member 65 protects a part of the first flexible substrate 73, a part of the second flexible substrate 75, and the electronic component 79 disposed in a space between the holder member 65 and the substrate 63.

The first flexible substrate 73 and the second flexible substrate 75 are folded back by approximately 180° via the bent portion 77 at the lead-out position from the touch panel 17 and the liquid crystal display 69, and are disposed along the touch panel 17 and the liquid crystal display 69. An extending portion 81 of the second flexible substrate 75 is bent so as to cover the electronic component 79 mounted on the first flexible substrate 73. The part of the first flexible substrate 73 on which the electronic component 79 is mounted and the electronic component 79 are interposed between the second flexible substrate 75 and the extending portion 81 thereof.

The holder member 65 is installed in the housing 43 between the touch panel 17 and the first flexible substrate 73 (see FIG. 3). The holder member 65 is provide with an accommodation recess 83 that is recessed toward the touch panel 17 side at a substantially central portion thereof. The accommodation recess 83 can accommodate the first flexible substrate 73 and the second flexible substrate 75. The holder member 65 includes a slit-shaped through hole 85 that is long along a front short side. The first flexible substrate 73 and the second flexible substrate 75, which are disposed on the inner side of the housing 43 relative to the bent portion 77, are inserted through the through hole 85.

In the holder member 65, a cutout portion 89 in which the opening detection switch 87 (see FIG. 3) is disposed is formed in the front short side in which the through hole 85 is formed.

The input display module 71 is attached by fitting the edges 59 of the touch panel 17 into the panel attachment open space 57 (see FIG. 3) of the upper case 53. The first flexible substrate 73 and the second flexible substrate 75 connected to the input display module 71 are folded back at the bent portion 77. For example, a fixing screw (not illustrated) inserted through the holder member 65 is screwed into a fixing column 97, and thereby, the holder member 65 is fixed to the upper case 53. At this time, the first flexible substrate 73 and the second flexible substrate 75 are inserted through the through hole 85 of the holder member 65 from an end. The first flexible substrate 73 and the second flexible substrate 75 that have passed through the through hole 85, and the electronic component 79 mounted on the first flexible substrate 73 are disposed in the accommodation recess 83 of the holder member 65.

The holder member 65 in which the first flexible substrate 73, the second flexible substrate 75, and the electronic component 79 have been accommodated in the accommodation recess 83 is covered with the substrate 63 from below. Fixing screws (not illustrated) penetrating the substrate 63 penetrate the holder member 65 and are fastened to the upper case 53, and thereby, the substrate 63 covering the holder member 65 is fixed to the upper case 53 with the holder member 65 interposed therebetween.

At this time, the opening detection switch 87 disposed in the cutout portion 89 of the holder member 65 is inserted between the front edge 59 of the touch panel 17 and the substrate 63. That is, in the information processing apparatus 11, both the opening detection switch 87 and the bent portion 77 are disposed between one side (for example, the front edge 59) of the touch panel 17 and the housing 43.

As for the opening detection switch 87, the interval between the substrate 63 and the touch panel 17 is reduced to a predetermined distance by fixing the substrate 63 to the upper case 53. Therefore, a key top 99 is pushed against the biasing force of an elastic member 101, and the contact point is opened or closed, and thereby, the conductive state or the non-conductive state is established. Therefore, the opening detection switch 87 detects that the touch panel 17 has not been opened.

The key top 99 is made of a resin material (for example, polybutylene terephthalate (PBT)). The elastic member 101 is made of rubber (for example, natural rubber or synthetic rubber) having a hardness lower than that of the key top 99. Examples of the synthetic rubber include silicone rubber, urethane rubber, acrylic rubber, styrene-butadiene rubber, ethylene-propylene rubber, and fluororubber.

On the other hand, when the touch panel 17 is disengaged from the housing 43 and the interval between the substrate 63 and the touch panel 17 increases to a predetermined distance, the opening detection switch 87 is brought into a non-conductive state or a conductive state by closing or opening the contact point by the elastic restoring force of the elastic member 101. Therefore, the opening detection switch 87 detects that the touch panel 17 is opened. The information processing apparatus 11 operates to prevent leakage of information (for example, clearing input information remaining in the electronic component 79) by detecting an open/close signal (a signal indicating the presence or absence of opening) of the opening detection switch 87.

In a state where the input display module 71 is attached to the panel attachment open space 57, the bent portions 77 of the first flexible substrate 73 and the second flexible substrate 75 are set to have a minimum excess length required at the time of assembly. In the information processing apparatus 11, when the back short side is opened with the front short side (edge 59) of the touch panel 17 placed on the stepped portion 61 as a fulcrum, the bent portions 77 of the first flexible substrate 73 and the second flexible substrate 75 extend, and the back short side is restricted from being opened any further. That is, an angle and a length (height) at which the touch panel 17 can be opened relative to the housing 43 are restricted. On the other hand, in the information processing apparatus 11, when the front short side (edge 59) of the touch panel 17 placed on the stepped portion 61 is opened in a direction away from the stepped portion 61, the opening detection switch 87 detects the opening.

Figure 5:
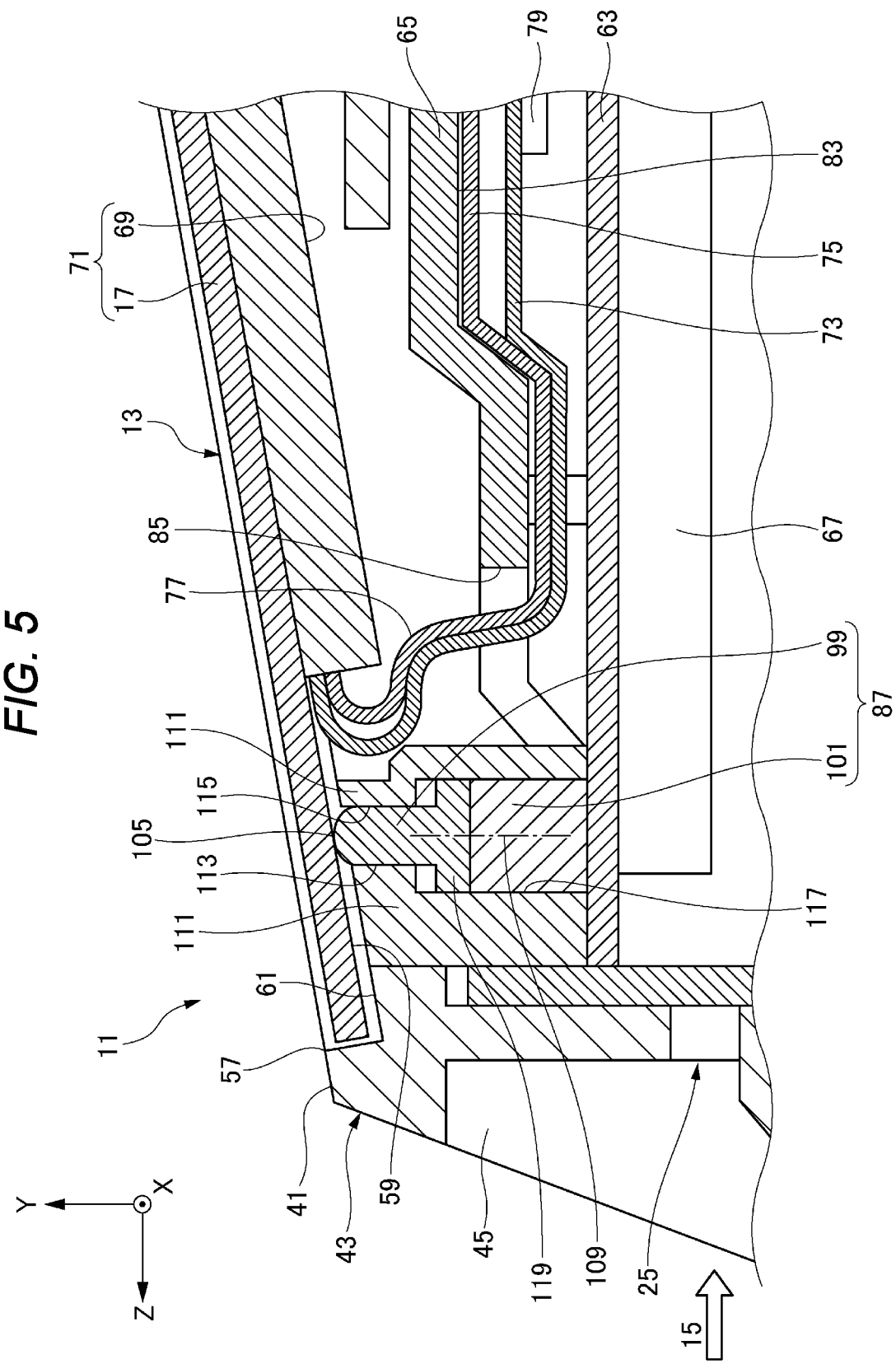
FIG. 5 is an enlarged view of a main part in FIG. 3.

FIG. 5 is an enlarged view of a main part in FIG. 3.

The opening detection switch 87 includes a contact opening and closing portion (not illustrated), the key top 99, and the elastic member 101. The contact opening and closing portion is fixed to the substrate 63. The key top 99 has a hemispherical surface 105 in contact with the edge 59. The elastic member 101 is elastically deformed by the pressing force from the key top 99 pressed by the edge 59, and comes into contact with, for example, an electrode (not illustrated) of the contact opening and closing portion. The key top 99 is less likely to deform than the elastic member 101, and is pressed in a minute region close to a point by the touch panel 17. Therefore, the elastic member 101 can be crushed in a direction perpendicular to the substrate 63.

The information processing apparatus 11 includes a tubular portion 111 in the housing 43. The tubular portion 111 is disposed such that a central axis 109 of the tubular portion 111 is perpendicular to the substrate 63. The tubular portion 111 slidably accommodates the key top 99 and the elastic member 101 inside the tubular portion 111.

Figure 6:
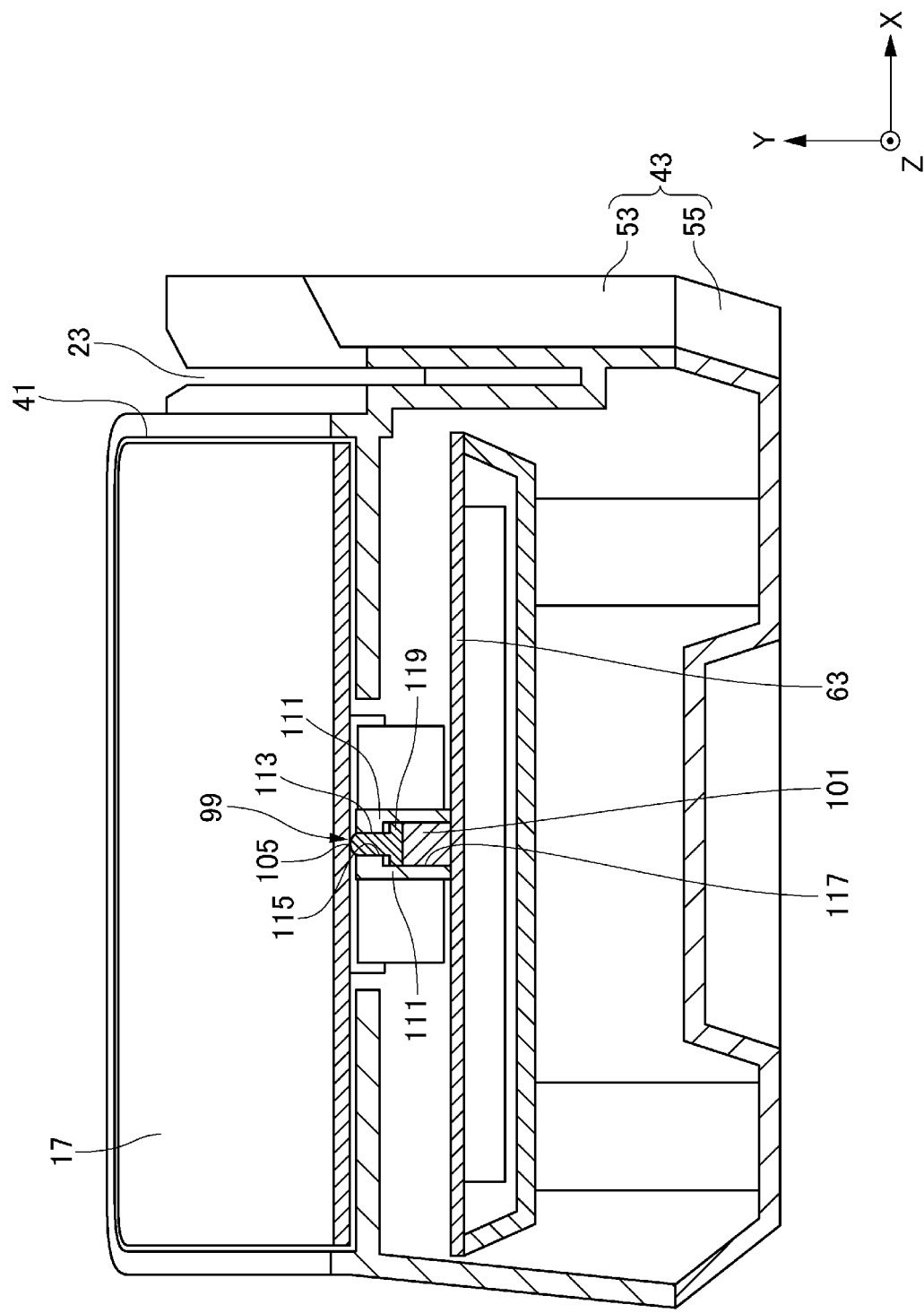
FIG. 6 is a cross-sectional view of a main part in which a position of the opening detection switch in the information processing apparatus is cross-sectioned in an XY plane.

FIG. 6 is a cross-sectional view of a main part in which the position of the opening detection switch 87 in the information processing apparatus 11 is cross-sectioned in an XY plane.

The opening detection switch 87 is disposed, for example, at a central position of the front short side of the touch panel 17. The tubular portion 111 includes a through hole 115 through which a small-diameter portion 113, which is the distal end side of the key top 99, is inserted. The tubular portion 111 includes an accommodation hole portion 117 having a diameter larger than that of the through hole 115. In the tubular portion 111, a stepped portion is formed between the accommodation hole portion 117 and the through hole 115. A large-diameter portion 119 is continuously provided on the lower side of the small-diameter portion 113 of the key top 99. The large-diameter portion 119 abuts against the stepped portion of the tubular portion 111 to restrict the key top 99 from coming off the through hole 115.

Figure 7:
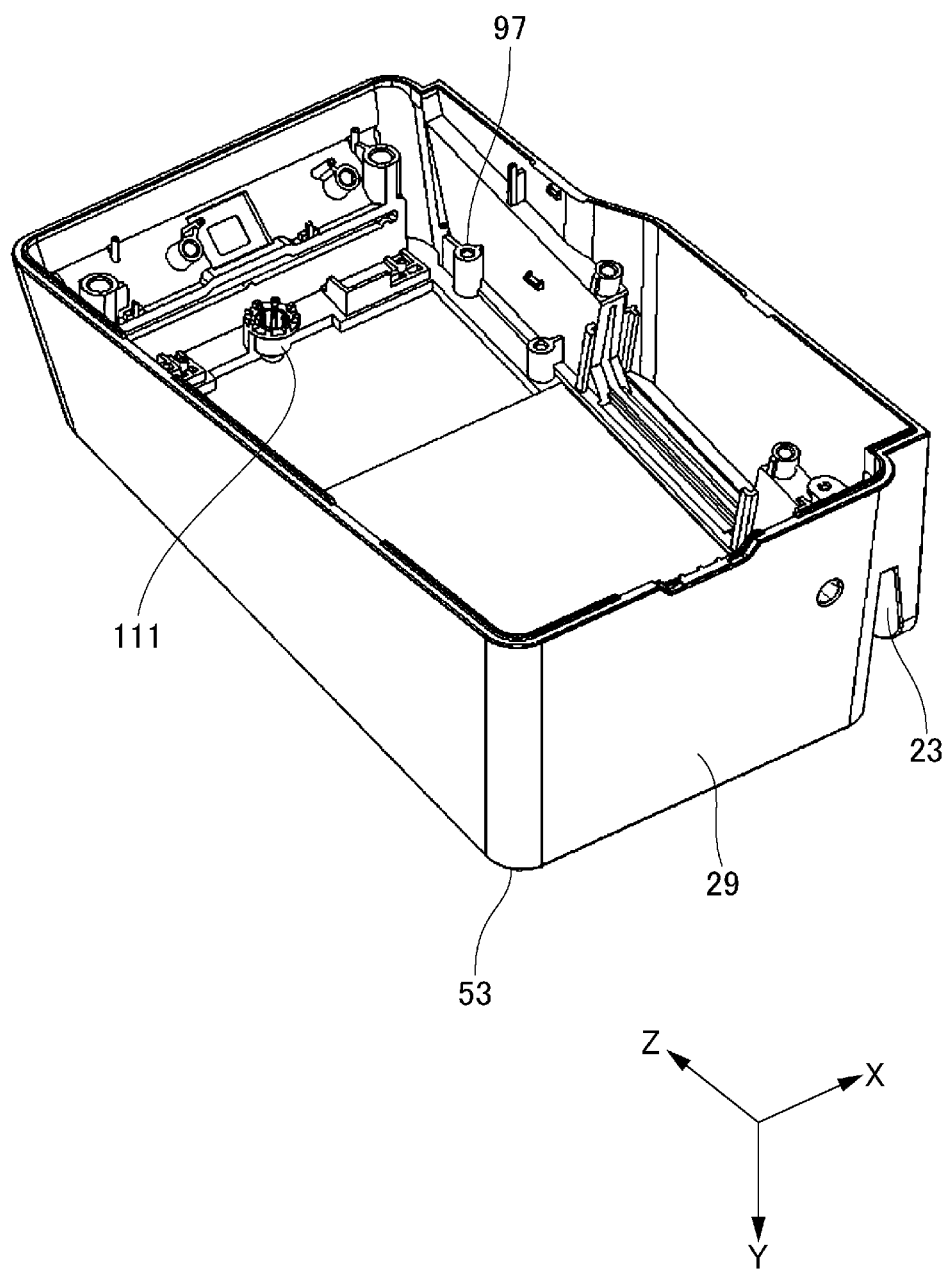
FIG. 7 is a perspective view of an upper case as viewed from below.

FIG. 7 is a perspective view of the upper case 53 as viewed from below.

The tubular portion 111 is formed integrally with, for example, the upper case 53 of the housing 43. The tubular portion 111 is formed in, for example, a substantially cylindrical shape. The upper case 53 and the tubular portion 111 may be formed separately, and the tubular portion 111 may be attached to the upper case 53.

Next, functions of the above configurations will be described.

The information processing apparatus 11 according to the present embodiment includes the housing 43, the substrate 63 fixed in the housing 43, the touch panel 17 installed on the housing 43, and the opening detection switch 87. The touch panel 17 is inclined to approach the substrate 63 toward the front 15 of the information processing apparatus 11. The opening detection switch 87 is provided between the edge 59 of the touch panel 17, which is on the front 15 side of the information processing apparatus 11, and the substrate 63. The opening detection switch 87 includes the contact opening and closing portion fixed to the substrate 63, the key top 99 having the hemispherical surface 105 in contact with the edge 59, and the elastic member 101. The elastic member 101 is elastically deformable by the pressing force from the key top 99 pressed by the edge 59, and thus, the contact opening and closing portion is pressed down.

The touch panel 17 is fixed to the housing 43 of the information processing apparatus 11. In addition, the substrate 63 is fixed in the housing 43. The substrate 63 is fixed in the housing 43 in a manner of being substantially horizontal (that is, parallel to the mounting surface 35) when the housing 43 is placed on, for example, the substantially horizontal placement surface 35. The placement surface 35 does not necessarily have to be horizontal. In addition to being placed on the placement surface 35, the housing 43 may be supported by a bracket, a support rod, or the like. In this case, the touch panel 17 may be further inclined together with the substrate 63 in order to improve visibility.

The inclination of the touch panel 17 is in a direction in which the touch panel 17 approaches the substrate 63 toward the front 15 of the information processing apparatus 11. The opening detection switch 87 is provided between the edge 59 of the touch panel 17, which is on the front 15 side of the information processing apparatus 11, and the substrate 63.

The opening detection switch 87 includes the contact opening and closing portion, the key top 99, and the elastic member 101. The contact opening and closing portion is provided on a surface of the substrate 63 facing the touch panel 17. The key top 99 is in contact with the edge 59 of the touch panel 17. The elastic member 101 is interposed between the key top 99 and the contact opening and closing portion. In the information processing apparatus 11, the touch panel 17, the key top 99, the elastic member 101, the contact opening and closing portion, and the substrate 63 are continuously arranged in this order on a straight line passing through these members such that adjacent members are in contact with each other.

Here, as described above, the touch panel 17 is fixed to a top of the housing 43 in an inclined manner in advance. The key top 99 of the opening detection switch 87 is in contact with the edge 59 of the touch panel 17 on the front 15 side. The elastic member 101, the contact opening and closing portion, and the substrate 63 are disposed on the side opposite to the edge 59 of the touch panel 17 to sandwich the key top 99. The substrate 63 is fixed to the housing 43 by a fixing screw or the like with the opening detection switch 87 interposed therebetween in a direction approaching the touch panel 17. During the fixing of the substrate 63, the substrate 63 moved in the direction approaching the touch panel 17 presses the elastic member 101, and the pressed elastic member 101 brings the key top 99 into close contact with the edge 59 of the touch panel 17.

That is, the opening detection switch 87 is held in a state where a preload is applied in the compression direction between the touch panel 17 and the substrate 63. When the touch panel 17 is opened, the preload of the opening detection switch 87 disappears, and the contact opening and closing portion is opened or closed. Accordingly, improper opening of the touch panel 17 is taken out as an operation signal from the contact opening and closing portion. The operation signal corresponds to an opening and closing signal of the opening detection switch 87.

For example, the elastic member 101 is formed of conductive rubber, or a conductor is provided on a contact point-facing surface of the elastic member 101, and the elastic member 101 is elastically deformed by the preload described above to bring the conductive rubber elastic member 101 or the conductor into contact with the electrode of the contact opening and closing portion, so that the operation signal can be obtained. When the touch panel 17 is opened, the preload caused by the pressing force from the edge 59 of the touch panel 17 disappears, and the elastic member 101 or the conductor is separated from the electrode due to the elastic restoring force of the elastic member 101. Accordingly, a detection signal indicating that the detection circuit connected to the electrode is opened is obtained as the operation signal. Note that this example of acquiring the operation signal is an example, and the present disclosure is not limited to the example.

In the information processing apparatus 11, the key top 99 has the hemispherical surface 105 that is in contact with the edge 59 of the touch panel 17. The key top 99 is formed in, for example, a cylindrical shape.

Figure 8A:
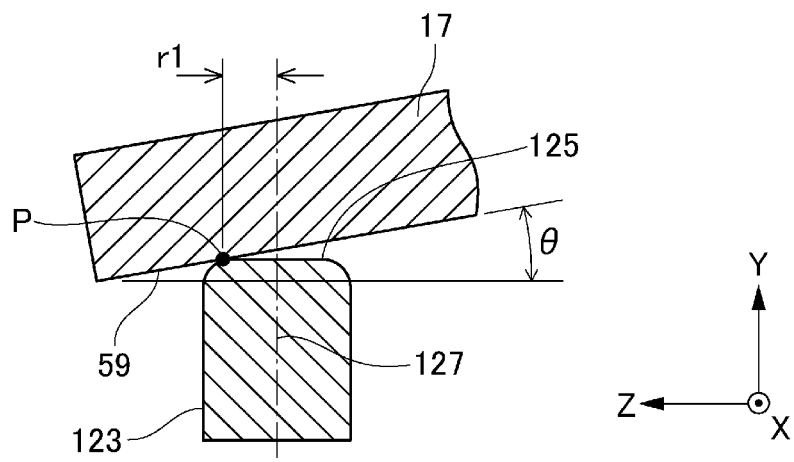
FIG. 8A is a view illustrating a pressing structure of a key top according to a comparative example.

FIG. 8A is a view illustrating a pressing structure of a key top 123 according to a comparative example.

A pressing surface of the key top 123 in the comparative example is a flat surface 125. In this case, when an axis 127 of the cylindrical key top 123 is used as a reference, a contact point P between the touch panel 17 and the key top 123, which contacts the key top 123 in order to press the key top 123, is eccentric from the axis 127 by a radius r1. Therefore, when the key top 123 is pressed by a load or a reaction force from the touch panel 17, a moment is generated, and the key top 123 is less likely to be displaced in a posture perpendicular to the substrate 63. As a result, assuming that the tubular portion 111 is present in the comparative example, a frictional force between an inner wall surface of the tubular portion 111 in the inner circumferential direction and the key top 123 becomes non-uniform. Therefore, the movement of the key top 123 in the direction along the axis 127 may be inhibited, or the key top 123 may not move even if the preload disappears.

Figure 8B:
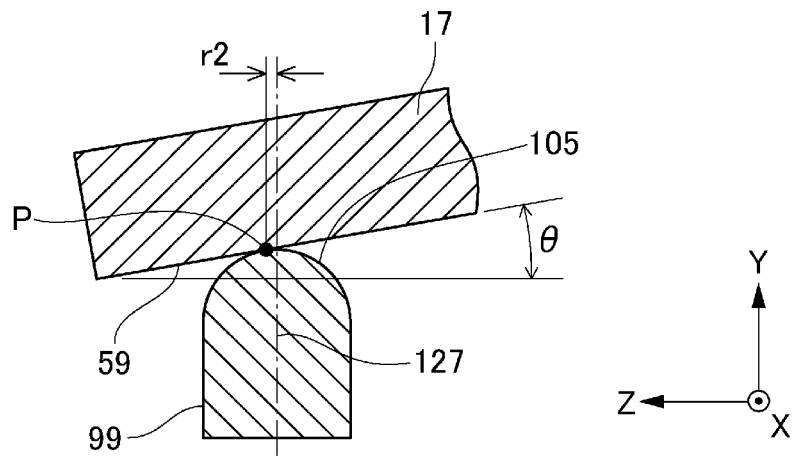
FIG. 8B is a view illustrating a pressing structure of a key top according to the first embodiment.

FIG. 8B is a view illustrating a pressing structure of the key top 99 according to the present embodiment.

In the key top 99 of the information processing apparatus 11, a pressing surface of the cylindrical key top 99 is formed by the hemispherical surface 105 having a radius substantially the same as the radius of the key top 99. Therefore, when an axis 127 of the cylindrical key top 99 is used as a reference, a contact point P between the touch panel 17 and the key top 99, which contacts the key top 99 in order to press the key top 99, is eccentric from the axis 127 by a radius r2 that is much smaller than the radius r1. Therefore, the eccentricity is prevented as compared with the comparative example. Therefore, when the key top 99 is pressed by a load or a reaction force from the touch panel 17, a moment is less likely to be generated (even if the moment is generated, the moment is very small), and the key top 99 is displaced in a posture perpendicular to the substrate 63. As a result, the frictional force between the inner wall surface of the tubular portion 111 in the inner circumferential direction and the key top 99 becomes substantially uniform, the movement of the key top 99 in the direction along the axis 127 becomes smooth, and the movement of the key top 99 when the preload disappears becomes more reliable. That is, the acquisition of the detection signal (operation signal) is further ensured. Therefore, the stability of the operation of the opening detection switch 87 is improved.

Figure 8C:
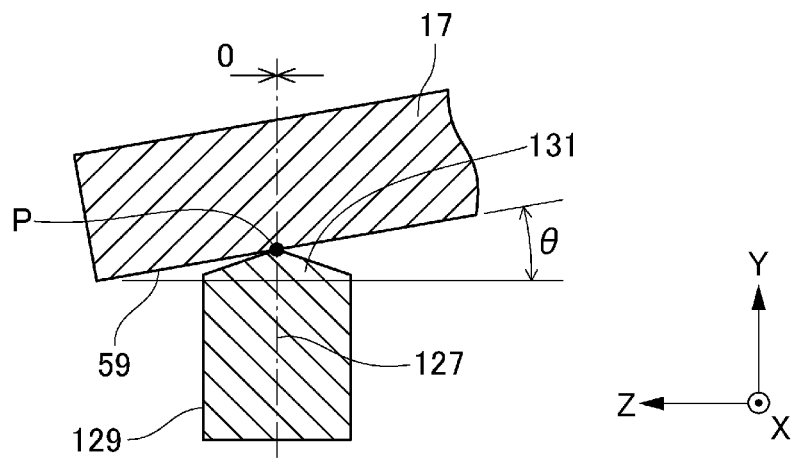
FIG. 8C is a view illustrating a pressing structure of a key top according to an application example of the first embodiment.

FIG. 8C is a view illustrating a pressing structure of a key top 129 according to an application example of the present embodiment.

In the key top 129 according to the application example, a conical portion 131 coaxial with the key top 129 is formed on a pressing surface of the key top 129. A minute spherical surface is formed on the top of the conical portion 131. In the key top 129, when an axis 127 of the cylindrical key top 129 is used as a reference, a contact point P between the touch panel 17 and the key top 129, which contacts the key top 129 in order to press the key top 129, is located on the axis and is not eccentric. Therefore, when the key top 129 is pressed by a load or a reaction force from the touch panel 17, no moment is generated, and the key top 129 is displaced in a posture perpendicular to the substrate 63. Here, it is assumed that a slip in the inclined direction of the touch panel 17 (the direction toward the back 29) does not occur at the contact point P. Accordingly, the frictional force between the inner wall surface of the tubular portion 111 in the inner circumferential direction and the key top 129 becomes uniform, the movement of the key top 129 in the direction along the axis 127 becomes smooth, and the movement of the key top 129 when the preload disappears becomes more reliable. Therefore, the stability of the operation of the opening detection switch 87 is improved.

When the key top 99 and the key top 129 are compared with each other, in the key top 99 of the information processing apparatus 11 in which the pressing surface is formed by the hemispherical surface 105 having substantially the same radius as the radius of the key top 99, the curvature of the hemispherical surface 105 is much larger than that of the key top 129, and stress concentration is less likely to occur in the touch panel 17. Therefore, when the information processing apparatus 11 includes the keytop 99, the key top 99 can smoothly move in the direction along the axis 127 while protecting the touch panel 17 from stress concentration.

The information processing apparatus 11 may include a tubular portion 111 disposed in the housing 43. As for the tubular portion 111, the central axis 109 of the tubular portion 111 is perpendicular to the substrate 63, and the key top 99 and the elastic member 101 may be slidably accommodated in the tubular portion 111.

In the information processing apparatus 11, the key top 99 and the elastic member 101 have outer diameters that substantially coincide with the inner diameter of a cylinder of the tubular portion 111, and are accommodated so as to be moveable inside the cylinder in a direction along the central axis 109 of the cylinder. The hemispherical surface 105 comes into contact with the inclined touch panel 17, and thereby, the key top 99 is pressed against the touch panel 17 by a force in a direction perpendicular to the substrate 63. In this case, a component force of side slip that slides in an inclined direction is generated in a direction in which the touch panel 17 is separated from the substrate 63. Even when the component force of the side slip is generated, the key top 99 and the elastic member 101 are guided in the direction perpendicular to the substrate 63 since the key top 99 and the elastic member 101 are slidably accommodated in the tubular portion 111 in which the central axis 109 is perpendicular to the substrate 63. Therefore, the key top 99 and the elastic member 101 can press the contact opening and closing portion in the direction perpendicular to the substrate 63.

In the information processing apparatus 11, the tubular portion 111 may be integrally formed with the housing 43.

In the information processing apparatus 11, various members may be formed integrally with the housing 43. The housing 43 may be integrally formed with the tubular portion 111, the panel arrangement surface 41 for obliquely disposing the touch panel 17, and the fixing column 97 for fixing the substrate 63 such that the substrate 63 is substantially horizontal to the placement surface 35 of the housing 43. Accordingly, in the information processing apparatus 11, the touch panel 17, the opening detection switch 87, the substrate 63, and the like can be positioned with high accuracy without using a separate guide member and without increasing the number of components.

The information processing apparatus 11 may include a second card slot 25 (an example of a card slot) opened in the front 15. A contact IC card (an example of a card) may be inserted into and removed from the second card slot 25 in a direction parallel to the substrate 63.

Accordingly, when the housing 43 is placed on the substantially horizontal placement surface 35, the contact IC card is inserted in the horizontal direction through the second card slot 25, and the information processing apparatus 11 can read and write data of the contact IC card. Therefore, the user can perform payment with good operability using the contact IC card. Since the touch panel 17 is inclined relative to the substrate 63, for example, the touch panel 17 is inclined in a direction in which the user can easily see the touch panel 17, the operability and visibility of the touch panel 17 of the information processing apparatus 11 can be improved.

In the information processing apparatus 11, the NFC antenna 21 (an example of an antenna) configured to enable contactless communication may be disposed around the touch panel 17 on the same plane as that of the touch panel 17.

Accordingly, the information processing apparatus 11 can read and write the contactless IC card by holding the contactless IC card over the touch panel 17. Therefore, it is possible to implement the same operability as that of the touch panel 17 with respect to payment or the like using the contactless IC card. Therefore, the user can perform payment by a good operation using the contactless IC card.

As described above, according to the information processing apparatus 11 of the present embodiment, the opening detection switch 87 hardly malfunctions, and deterioration in security can be prevented.

Although various embodiments are described above with reference to the drawings, it is needless to say that the present disclosure is not limited to such examples. It will be apparent that those skilled in the art can conceive of various modifications and alterations within the scope described in the claims, and it is understood that such modifications and alterations naturally belong to the technical scope of the present disclosure. In addition, the respective constituent elements in the above-described embodiments may be combined as desired without departing from the gist of the disclosure.

The invention claimed is:

1. An information processing apparatus comprising:
    a housing;
    a substrate fixed in the housing;
    a touch panel installed in the housing and disposed to be inclined in a direction approaching the substrate toward a front of the information processing apparatus;
    an opening detection switch provided between an edge of the touch panel on a front side and the substrate; and
    a tubular portion disposed in the housing,
    wherein the opening detection switch comprises:
        a contact opening and closing portion fixed to the substrate;
        a key top having a hemispherical surface in contact with the edge; and
        an elastic member elastically deformable by a pressing force from the key top pressed by the edge to press the contact opening and closing portion, and
    wherein a central axis of the tubular portion is perpendicular to the substrate, and the key top and the elastic member are slidably accommodated in the tubular portion.

2. The information processing apparatus according to claim 1,
    wherein the tubular portion is integrally formed with the housing.

3. The information processing apparatus according to claim 1, further comprising:
    a card slot opened in the front,
    wherein the card slot allows a card to be inserted thereinto and removed therefrom in a direction parallel to the substrate.

4. The information processing apparatus according to claim 1, further comprising:
    an antenna configured to enable contactless communication,
    wherein the antenna is disposed around the touch panel on a same plane as that of the touch panel.

* * * * *